United States Patent
Warfel et al.

(10) Patent No.: US 6,708,958 B1
(45) Date of Patent: Mar. 23, 2004

(54) AIR VALVE MECHANISM FOR TWO-CYCLE ENGINE

(75) Inventors: Paul A. Warfel, Texarkana, TX (US); Spencer D. Russ, DeKalb, TX (US); Rodney W. Tynes, Shreveport, LA (US)

(73) Assignee: Electrolux Home Products, Inc., Cleveland, OH (US)

( * ) Notice: Subject to any disclaimer, the term of this patent is extended or adjusted under 35 U.S.C. 154(b) by 16 days.

(21) Appl. No.: 10/265,480

(22) Filed: Oct. 4, 2002

(51) Int. Cl.$^7$ .............................................. F02M 23/03
(52) U.S. Cl. ................ 261/45; 123/73 BA; 123/73 CA; 261/47; 261/52; 261/DIG. 1
(58) Field of Search ........................... 261/23.3, 45–47, 261/DIG. 1; 123/73 BA, 73 CA, 73 PP, 69 V, 70 V, 71 V

(56) References Cited

U.S. PATENT DOCUMENTS

| | | | |
|---|---|---|---|
| 968,200 A | 8/1910 | Scott | 123/73 CC |
| 2,317,772 A | 4/1943 | Huber et al. | 123/73 A |
| 2,981,279 A | 4/1961 | Beck | 137/480 |
| 3,439,658 A | * 4/1969 | Simonet | 123/277 |
| 3,882,831 A | * 5/1975 | Date et al. | 123/274 |
| 3,982,507 A | * 9/1976 | Asaka et al. | 123/322 |
| 4,060,062 A | * 11/1977 | Tsutsui et al. | 261/23.3 |
| 4,067,302 A | 1/1978 | Ehrlich | 123/73 A |
| 4,075,985 A | 2/1978 | Iwai | 123/73 A |
| 4,094,931 A | * 6/1978 | Karino | 261/23.3 |
| 4,176,631 A | 12/1979 | Kanao | 123/73 PP |
| 4,216,747 A | 8/1980 | Noguchi et al. | 123/443 X |
| 4,248,183 A | 2/1981 | Noguchi et al. | 123/51 B |
| 4,248,185 A | 2/1981 | Jaulmes | 123/73 R |
| 4,256,063 A | * 3/1981 | Sumiyoshi et al. | 123/184.45 |
| 4,294,205 A | * 10/1981 | Iiyama et al. | 123/274 |
| 4,333,429 A | * 6/1982 | Iiyama et al. | 123/274 |
| 4,414,939 A | * 11/1983 | Jahoda | 123/274 |
| 4,481,910 A | 11/1984 | Sheaffer | 123/73 R |
| 4,861,522 A | 8/1989 | Gerhardy et al. | 261/35 |
| 4,903,655 A | 2/1990 | Vonderau et al. | 261/35 X |
| 4,936,267 A | 6/1990 | Gerhardy et al. | 123/179 G |
| 4,944,272 A | 7/1990 | Carlsson et al. | 123/438 |
| 4,969,425 A | 11/1990 | Slee | 123/73 AB |
| 4,995,349 A | 2/1991 | Tuckey | 123/65 VB |
| 5,200,118 A | 4/1993 | Hermle | 261/64.6 |
| 5,283,013 A | 2/1994 | Gerhardy | 261/35 |
| 5,379,732 A | 1/1995 | Mavinahally et al. | 123/73 AA |
| 5,681,508 A | 10/1997 | Gerhardy | 261/35 |
| 5,743,240 A | 4/1998 | Zerrer et al. | 123/518 |
| 6,000,683 A | 12/1999 | Van Allen | 261/52 |
| 6,085,703 A | 7/2000 | Noguchi | 123/73 R |
| 6,112,708 A | 9/2000 | Sawada et al. | 123/73 PP |
| 6,123,322 A | 9/2000 | Sasaki | 261/64.1 |
| 6,152,093 A | 11/2000 | Sawada et al. | 123/73 PP |

(List continued on next page.)

FOREIGN PATENT DOCUMENTS

| | | |
|---|---|---|
| EP | 0 933 514 A1 | 8/1999 |
| EP | 0 971 110 A1 | 1/2000 |

*Primary Examiner*—Richard L. Chiesa
(74) *Attorney, Agent, or Firm*—Pearne & Gordon LLP

(57) ABSTRACT

A carbureted two-cycle engine including an intake channel, a choke valve in the intake channel fixed to a pivotable choke valve shaft and lever, and a throttle valve in the intake channel fixed to a pivotable throttle valve shaft and lever. The engine includes an air channel in communication with fresh air, and an air valve fixed to a pivotable air valve shaft and lever. A piston within a cylinder of the engine includes a transfer port for intermittently connecting the intake channel and the air channel with a combustion chamber. An activating lever pivotably mounted to the air valve shaft transmits movement of the throttle lever to the air valve lever after a predetermined angle of rotation of the throttle lever. A fast idle latch is engagable by the choke lever to hold the throttle lever in a fast idle position until the throttle lever is separately moved.

14 Claims, 11 Drawing Sheets

U.S. PATENT DOCUMENTS

| | | | |
|---|---|---|---|
| 6,202,989 B1 | 3/2001 | Pattullo | 261/52 |
| 6,216,650 B1 | 4/2001 | Noguchi | 123/73 A |
| 6,240,886 B1 | 6/2001 | Noguchi | 123/73 AA |
| 6,257,181 B1 | 7/2001 | Rosskamp et al. | 123/73 AA |
| 6,267,088 B1 | 7/2001 | Rosskamp et al. | 123/73 PP |
| 6,289,856 B1 | 9/2001 | Noguchi | 123/73 PP |
| 6,298,811 B1 | 10/2001 | Sawada et al. | 123/13 A |
| 6,328,288 B1 | 12/2001 | Gerhardy | 261/35 |
| 6,334,606 B1 | 1/2002 | Tobinai et al. | 261/23.3 |
| 6,347,787 B1 | 2/2002 | Tobinai et al. | 261/23.3 |
| 6,349,925 B1 | 2/2002 | Tobinai et al. | 261/23.3 |
| 6,352,058 B1 | 3/2002 | Yuasa et al. | 123/73 R |
| 6,354,251 B1 | 3/2002 | Toda | 123/73 A |

* cited by examiner

AIR BOX WITH SEPERATE VALVE PLATE

AIR VALVE MECHANISM FOR TWO-CYCLE ENGINE

BACKGROUND OF THE INVENTION

The present invention relates to carburetors for two cycle engines, and more particularly to a carburetor and air-valve assembly and linkage.

Two-cycle engines are desirable for handheld tools where weight is critical because of their high power to weight ratio as compared to four-cycle engines. However, trapping efficiency of conventional two-cycle engines will not meet the low emissions requirements set forth by government regulations in the future because the fundamental design of the two-cycle engine results in too much unburned fuel being discharged into the atmosphere.

The discharge of raw, unburned fuel into the atmosphere is substantially caused by the exhaust and transfer ports being opened and closed by the piston, and for a small period both are open simultaneously during the piston travel. During that small duration of time, when both the intake and exhaust ports are open, the unburned fuel can exit the engine, which increases the measured emissions output of the engine while decreasing the engine's efficiency.

SUMMARY OF THE INVENTION

The present invention provides a carburetor and air valve assembly for a two-cycle internal combustion engine with stratified air scavenging, the assembly comprising: a housing assembly; an intake channel in the housing assembly for delivering fuel and air mixture to an intake port of the engine; a throttle valve disposed within the intake channel and fixed to a pivotable throttle valve shaft; a throttle lever fixed to the throttle valve shaft; an air channel in the housing assembly for delivering fuel-free air to an airport of the engine; an air valve disposed within the air channel and fixed to a pivotable air valve shaft; an air valve lever fixed to the air valve shaft, and an activating lever moveably mounted to the housing assembly and adapted to transmit movement of the throttle lever to the air valve lever.

According to another aspect, the present invention provides a two-cycle internal combustion engine system comprising: a carburetor comprising an intake channel, a choke valve in the intake channel fixed to a pivotable choke valve shaft and a throttle valve in the intake channel fixed to a pivotable throttle valve shaft; an air channel in communication with fresh air and comprising an air valve fixed to a pivotable air valve shaft; a cylinder; a combustion chamber within the cylinder; a fuel port communicating the intake channel with the cylinder; an air port communicating the air channel with the cylinder; a piston arranged for reciprocating movement within the cylinder and comprising a transfer port for intermittently connecting the fuel port and air port with the combustion chamber; a throttle lever fixed to the throttle valve shaft; an air valve lever fixed to the air valve shaft; an activating lever pivotably mounted to the air valve shaft and adapted to transmit movement of the throttle lever to the air valve lever after a predetermined angle of rotation of the throttle lever; a choke valve lever fixed to the choke valve shaft; and a fast idle latch engagable by the choke valve lever to hold the throttle lever in a fast idle position until the throttle lever is separately moved.

DETAILED DESCRIPTION OF THE INVENTION

Figure 1:
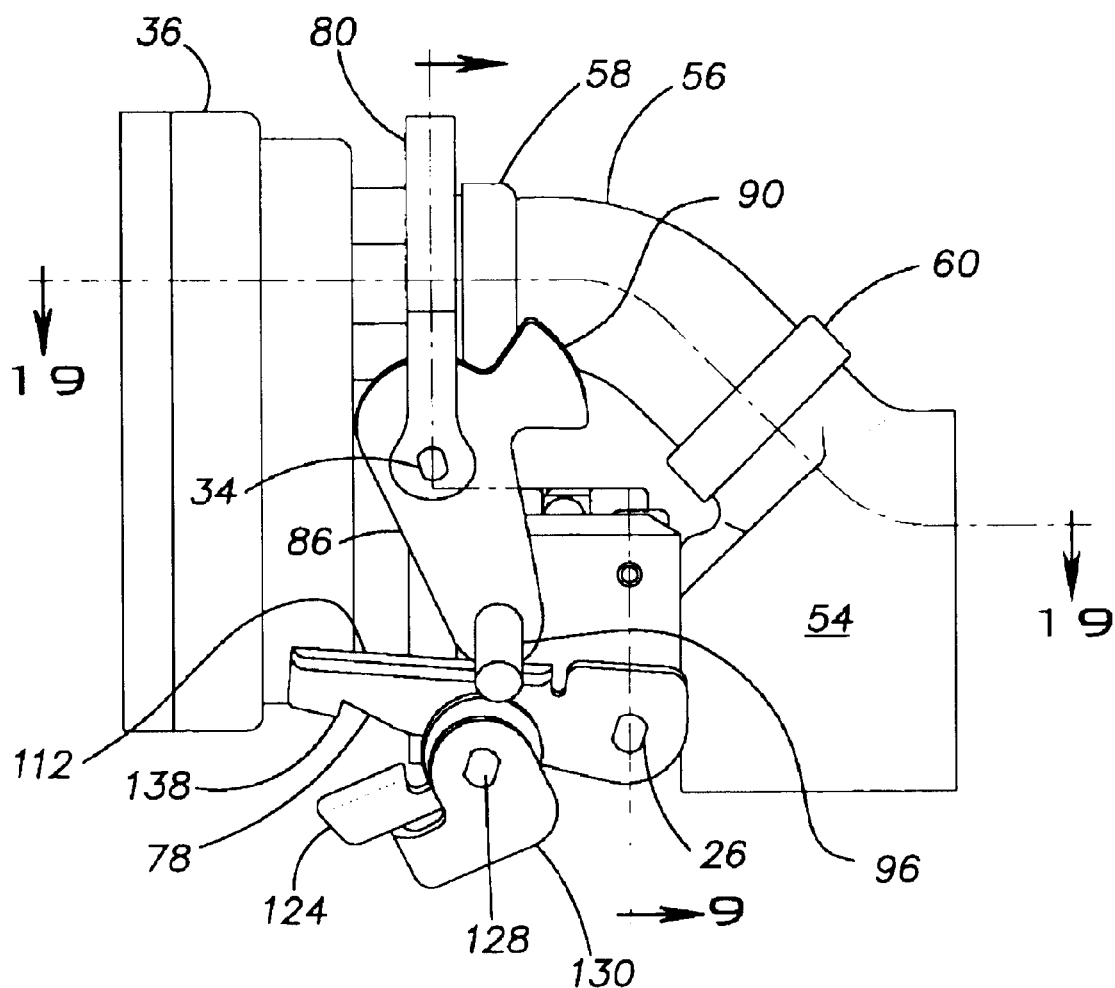
FIG. 1 is a front view of a carburetor and air-valve assembly according to a first embodiment of the present invention.
Figure 2:
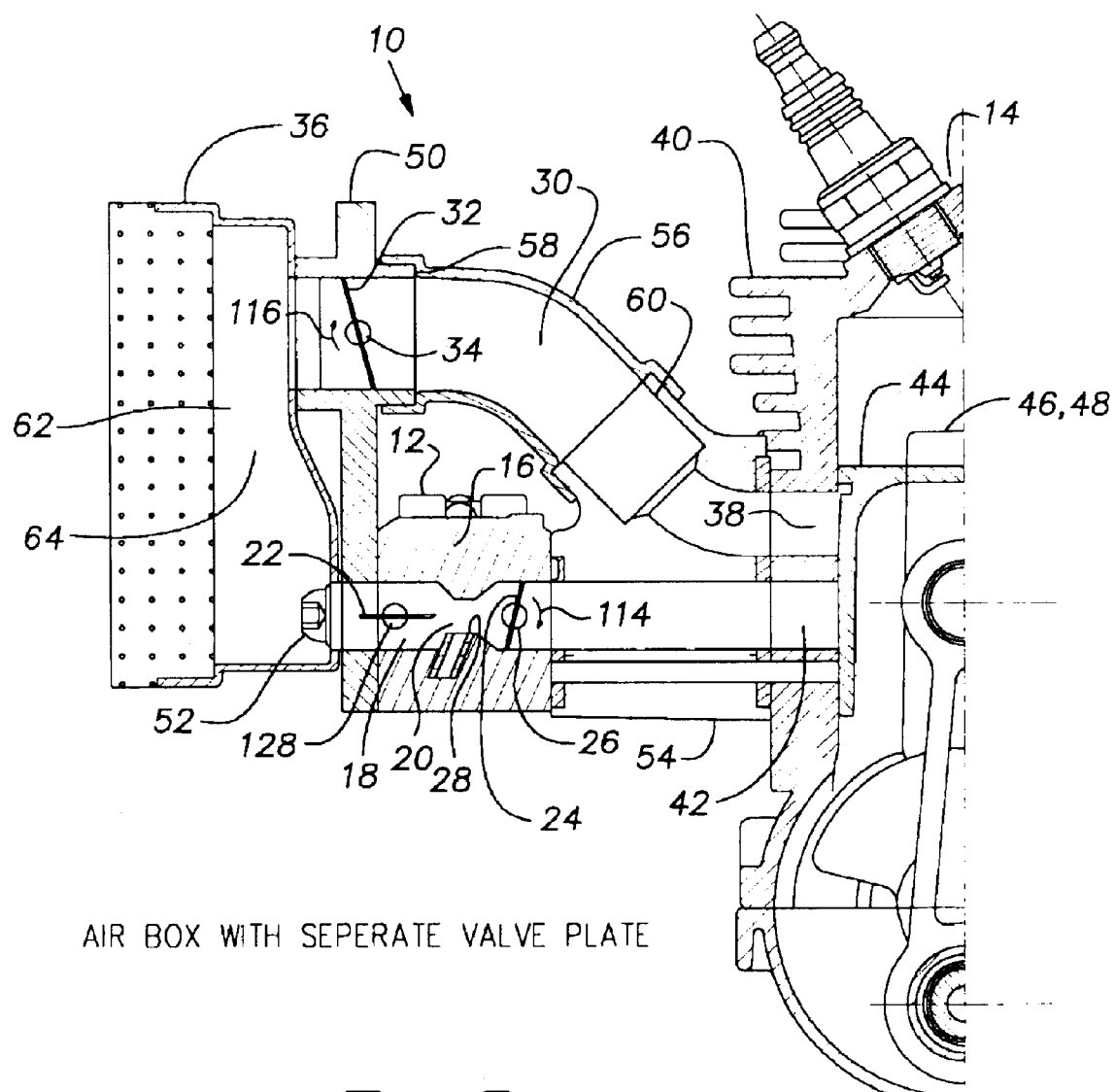
FIG. 2 is a cross-sectional view of the carburetor and air-valve assembly of FIG. 1 in which the valve positions are shown in an idle mode of operation.

According to the present invention, a first embodiment of a carburetor and air valve assembly 10 is shown in FIGS. 1, 2, 6–15, 18 and 19. Referring to FIG. 2, a carburetor 12 serves for supplying fuel and air mixture to an internal combustion engine 14. The carburetor 12 is a diaphragm-type carburetor 12 for an internal combustion engine 14 that operates with stratified air scavenging, specifically but not limited to hand held power equipment, such as chain saws, string trimmers, brush cutters, pole saws, or the like. The carburetor 12 comprises a carburetor housing 16 in which is formed a continuous intake channel portion 18 having a venturi section 20. The carburetor has two independent butterfly valves within the intake channel 18. The first valve is called the choke valve 22, and when closed it restricts the air opening to enrich the fuel-air ratio for improved cold starting performance. The second valve inside the carburetor 12 is the throttle valve 24, which varies the amount and flow of the fuel-air mixture, which in turn controls the engine speed.

The throttle valve 24 is located down stream from the venturi section 20. The throttle valve 24 is pivotally held via a shaft 26 that is mounted in the carburetor housing 16. A main fuel-delivery duct 28 opens into the venturi section 20. Fuel-delivery idle ducts (not shown) open into the intake channel portion 18 in the vicinity of the throttle valve 24. The channels and ducts are supplied fuel from the fuel-filled control chamber (not shown) from within the carburetor housing 16, which are in turn supplied via fuel line from a fuel tank (not shown). The fuel is pumped to the carburetor 12 via a fuel pump powered by fluctuating crankcase pressure from the two-cycle engine 14.

In addition to the intake channel portion 18, by means of which a fuel/air mixture is supplied to the internal combustion engine 14, an air channel 30 is provided and has an air butterfly valve 32 mounted on a pivotable shaft 34. The air channel 30 acts as a bypass to the intake channel portion 18 and connects a clean air side of an air filter housing 36 with an air port 38 in the cylinder 40. By way of the linkage described below, the two separate valves 24, 32 are timed and orientated specifically to obtain peak performance of the engine in the forms of horsepower and emissions.

Figure 9:
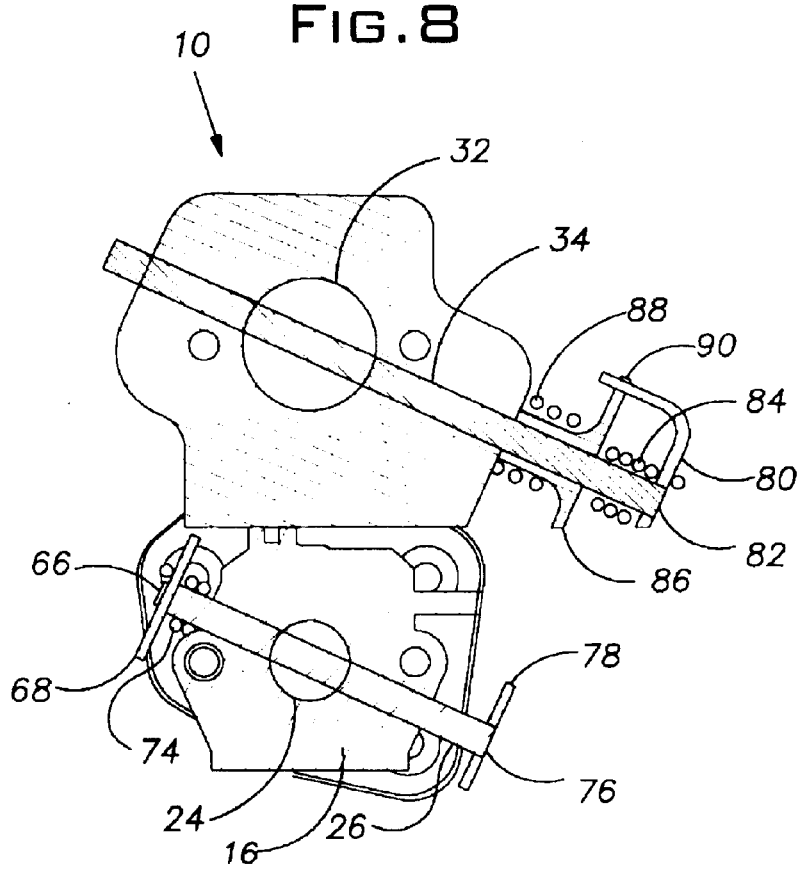
FIG. 9 is a cross-sectional view of the carburetor and air-valve assembly of FIG. 1 taken along section line 9—9.

As best seem from FIG. 9, the shaft 26 of the throttle valve 24 and the shaft 34 of the air valve 32 are disposed approximately parallel to one another. Alternatively, the throttle valve shaft 26 may be disposed at an angle relative to the air valve shaft 34 according to the present invention.

The carburetor 12 is responsible for delivering a blend of fuel and air to the engine 14, which is drawn into the crankcase through a fuel port 42 on the side of the cylinder 40. This cylinder fuel port 42 is opened and closed by the piston 44 pivotally connected to the crankshaft that rotates horizontally in the crankcase and is supported by bearings. The carburetor 12 is constructed similarly to that of a conventional two-cycle engine, but with a slightly smaller venturi 20 size to compensate for the air channel 30. The combined cross-sectional areas of the air channel 30 and intake channel 18 of the carburetor 12 are similar to that of a standard two-cycle engine. Once the fuel/air enters the crankcase it is fed to the combustion chamber by transfer ports 46, 48, which are also opened and closed by the piston's 44 travel up and down the cylinder bore. These ports 46, 48 opening and closing are timed to achieve maximum performance.

The air channel 30 and air valve 32 are responsible for delivering fresh air to the top of the transfer ports 46, 48 in order to help improve the emissions characteristic of the two-cycle engine 14. This stratified air scavenging engine concept is designed to reduce the amount of unburned fuel that leaves the combustion chamber when the exhaust port is open. This is achieved by dispersing the fresh air from the air channel 30 into the combustion chamber first when the exhaust port is open, and scavenging the exhausted fuel with the fresh air. Immediately following the fresh air charge is the fuel-air mixture that is delivered from the crankcase through the transfer ports 46, 48 into the combustion chamber. By separating the fresh air and the fuel-air mixture in such a stratified fashion to reduce the unburnt fuel discharged from the exhaust port, engine emissions are reduced and engine efficiency is increased.

In the first embodiment, shown in FIG. 2, the air channel 30 is formed by a separate air valve housing 50, which is trapped between the carburetor housing 16 and the air filter housing 36. Carburetor mounting screws 52 are used to secure the air valve housing 32 and the air filter housing 36 to an intake adaptor 54. The air channel 30 is transversely connected to the intake adaptor 54 by a flexible rubber tube 56. The rubber tube 56 forms an airtight seal at its ends 58, 60 on each of the air valve housing 32 and intake adaptor 54, respectively. Alternately the air channel 30 could be formed by a rigid material instead of the rubber tube 56 described.

The intake adaptor 54 provides heat insulation between the engine 14 and the carburetor 12 and the air inlet 30. Excessive heat on the carburetor 12 from the engine 14 will vaporize the gasoline prematurely and cause what is commonly known as "vapor lock." If this occurs, not enough fuel enters the engine 14 and the engine 14 will not function.

Both the air channel 30 and the intake channel 18 are connected to the air filter housing 36 which contains a filter element. The filter element traps and prevents dirt, dust and other particles from entering the engine 14, which would cause internal damage to the engine components. The air channel 30 is connected to a clean air chamber 62 of the air filter housing 36 to the intake adaptor 54, which feeds the cylinder air port 38. The clean air chamber 62 inside the air filter housing 36 may be a single chamber or may alternately be separated into individual and separate areas by a divider wall 64 formed in the air filter housing 36.

Figure 3:
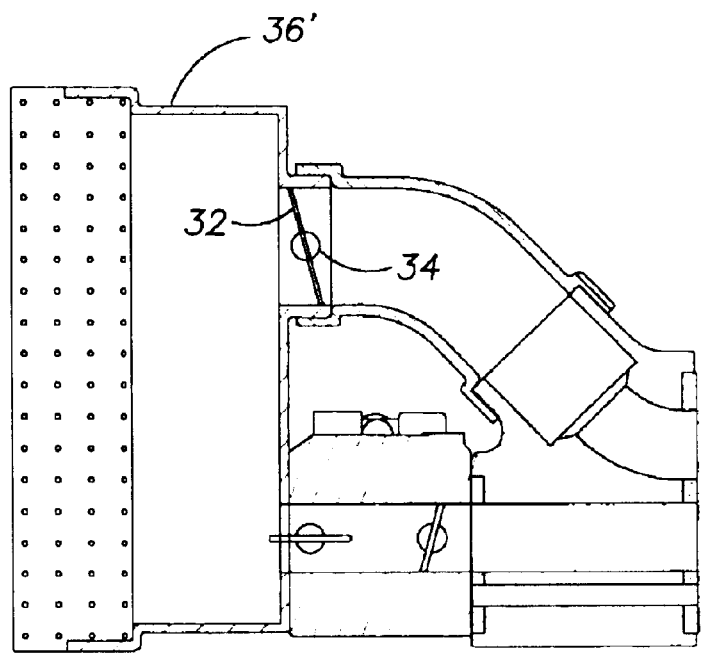
FIG. 3 is a cross-sectional view of a second embodiment of a carburetor and air-valve assembly according to the present invention.

According to a second embodiment, as shown in FIG. 3, the air valve 32 and a pivotable air valve shaft 34 are secured within an alternative air filter housing 36' which would eliminate the air valve housing 50 of the first embodiment.

Figure 4:
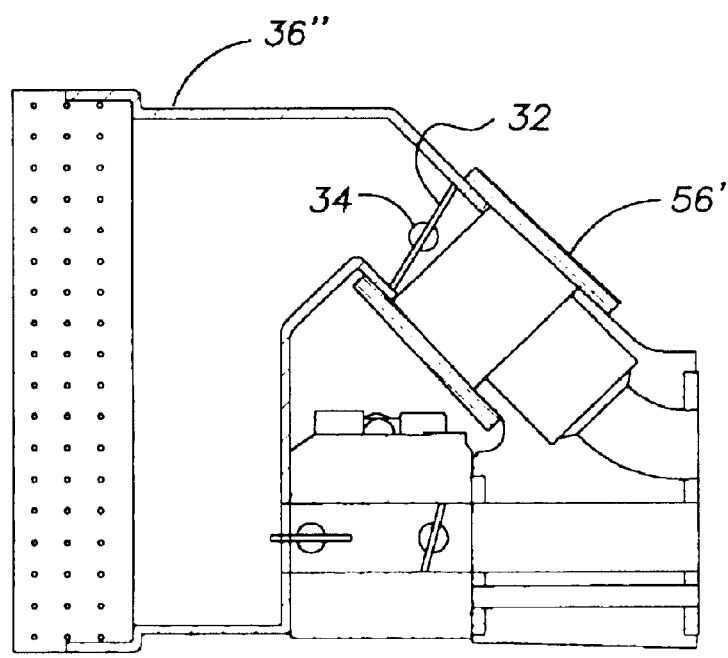
FIG. 4 is a cross-sectional view of a third embodiment of a carburetor and air-valve assembly according to the present invention.

According to a third embodiment, as shown in FIG. 4, similar to that in FIG. 3, a straight tube 56' could be used by extending a second alternative filter housing 36' out and downward.

Figure 5:
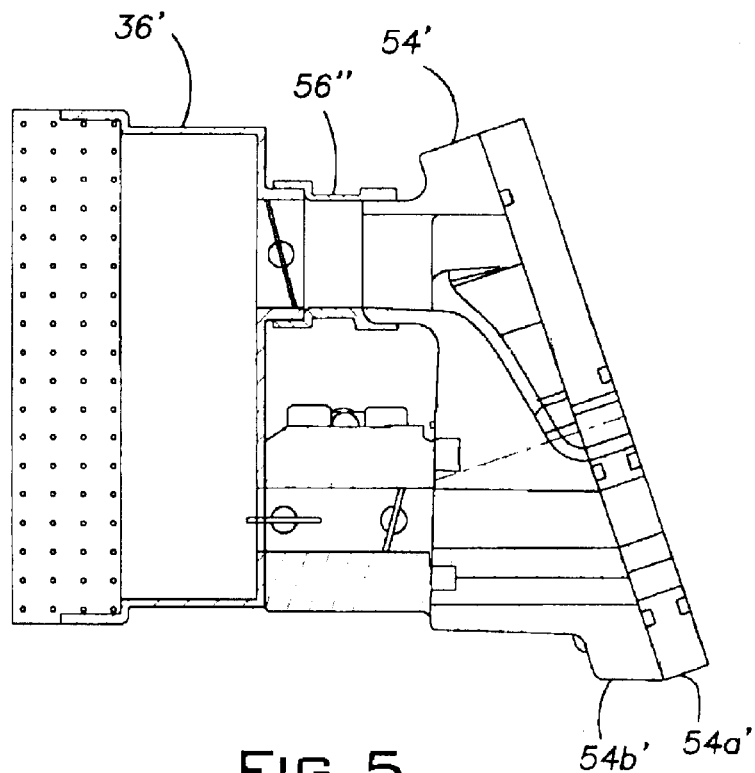
FIG. 5 is a cross-sectional view of a fourth embodiment of a carburetor and air-valve assembly according to the present invention.

According to a fourth embodiment, as shown in FIG. 5, the intake adapter 54' is formed of two pieces, a first intake adapter portion 54a' and a second intake adapter portion 54b'. The second intake adapter portion 54b' has an angular offset which allows the use of a straight tube 56" to connect to the filter housing 36', rather than the curved tube 56 of the first and second embodiments. Further, the two piece intake adapter 54' may be formed through conventional casting methods since each portion 54a', 54b' does not contain any compound curves.

Referring again to the first embodiment shown in FIGS. 1, 2, 6–15, 18 and 19, a linkage mechanism described hereinafter functionally connects the throttle valve 24 and air valve 32. Additional linkage also allows for a choke operation during cold starting, and a fast idle setting for starting. This is achieved with several levers that all work together to rotate the butterfly valves into ideal positions for different modes of operation.

Figure 18:
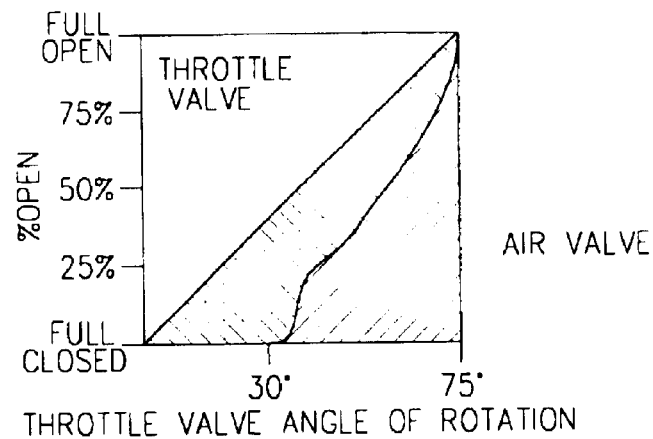
FIG. 18 is a chart depicting the relationship between the air and throttle valve progression from fully closed through fully open according to the present invention.

The air valve 32 must cooperate with the throttle valve 24 in the carburetor 12 since both valve 24, 32 are responsible for governing the amount of fuel-air mixture that is delivered to the engine 14. The air valve 32 must also remain closed during slow engine speeds, like starting and idling, or the engine 14 will stall because the mixture goes too lean (not enough fuel to produce combustion). The linkage mechanism describe hereinafter is designed to not open the air valve until the throttle valve 24 has rotated approximately 30 degrees from its normally closed position. This angle can be adjusted as appropriate for a particular application. Referring to FIG. 18, once the air valve 32 starts to open, its progression to a fully open position is non-linear, and does not have the same opening rate as the throttle valve 24. The different slopes between the throttle valve 24 and air valve 32 allow for optimization of performance for mid-range power and acceleration. Thus progression can be modified by use of cam shapes on the lever or lobe-shaped slider pin. The opening of the air valve 32 is opened slowly, so to not drown the engine with too much fresh air. Once the throttle valve 24 has achieved approximately 86% full open, the air valve 32 has less affect, and therefore can complete it's progression to full open at an accelerated rate.

Figure 7:
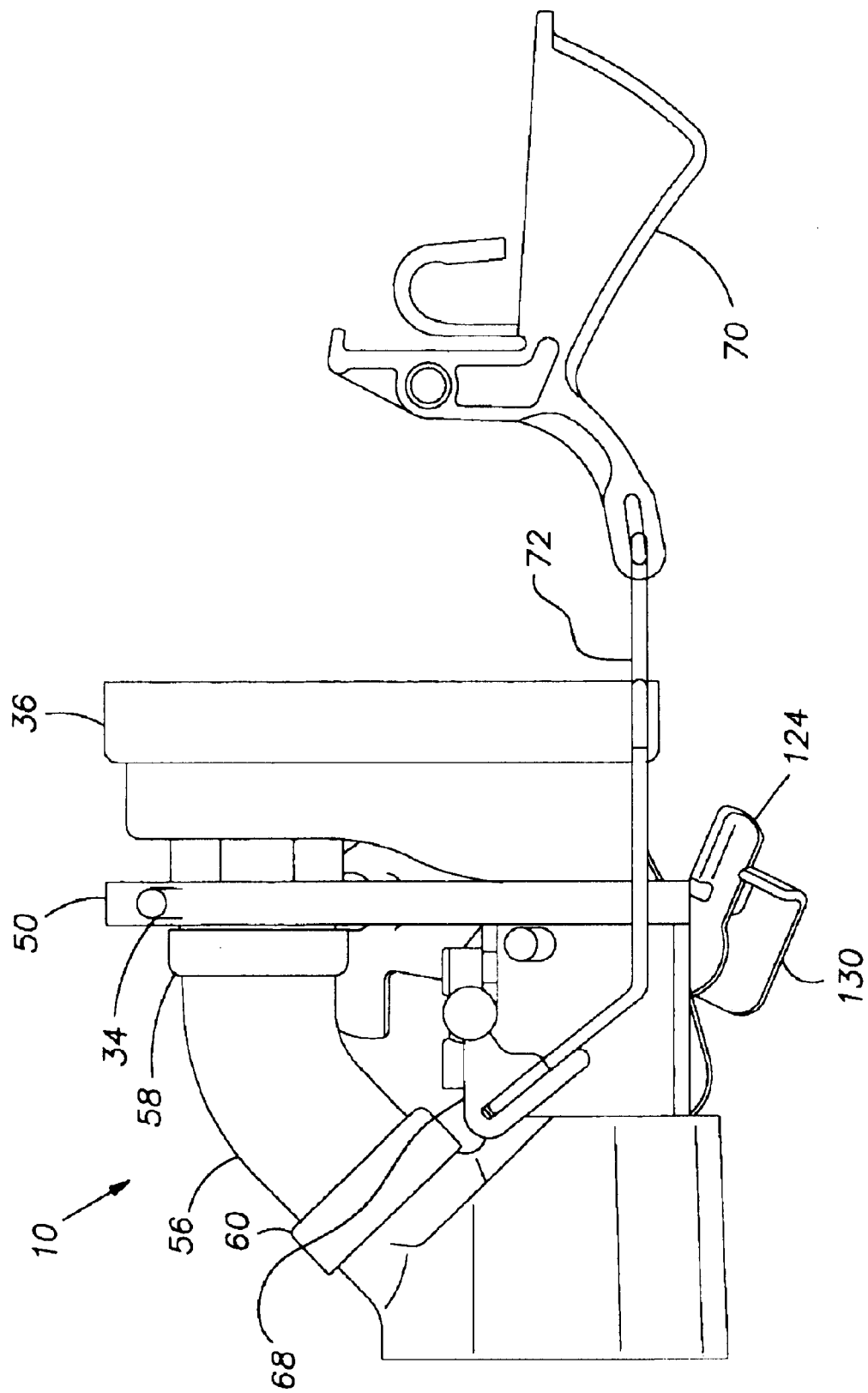
FIG. 7 is a rear view of the carburetor and air-valve assembly of FIG. 1 showing a throttle trigger attached thereto.
Figure 8:
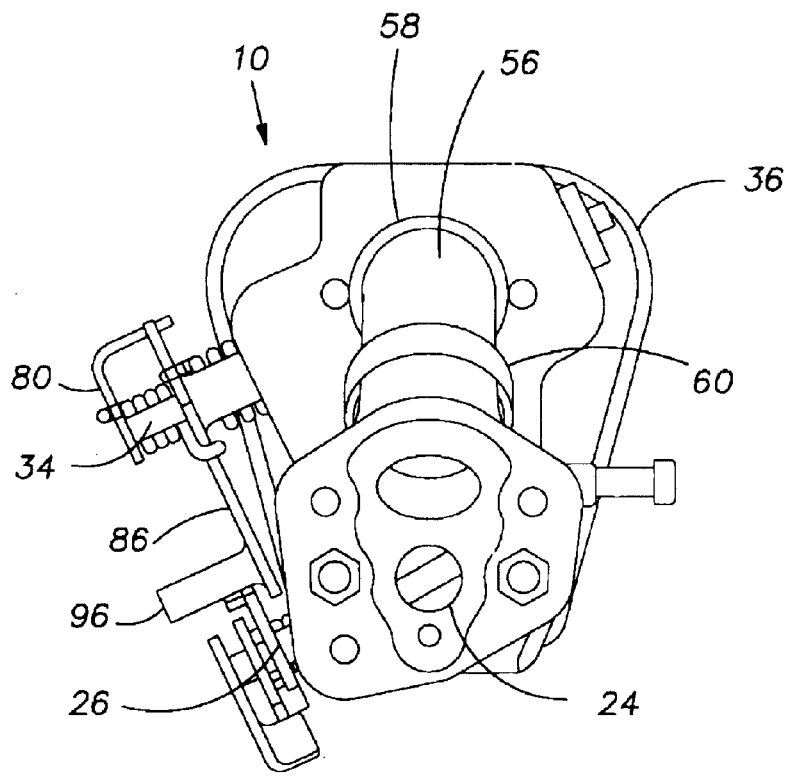
FIG. 8 is a right side view of the carburetor and air-valve assembly of FIG. 1.

As best shown in FIGS. 7 and 9, a first end 66 of the throttle valve shaft 26 carries a throttle valve actuating lever 68 that is connected with a throttle trigger 70 by means of a wire or cable 72 for adjusting the throttle valve 24. In particular, the actuating lever 68 is fixedly disposed at the first end 66 of the butterfly valve shaft 26 and is spring loaded in the closing direction of the throttle valve 24 by means of a return spring 74.

Figure 12:
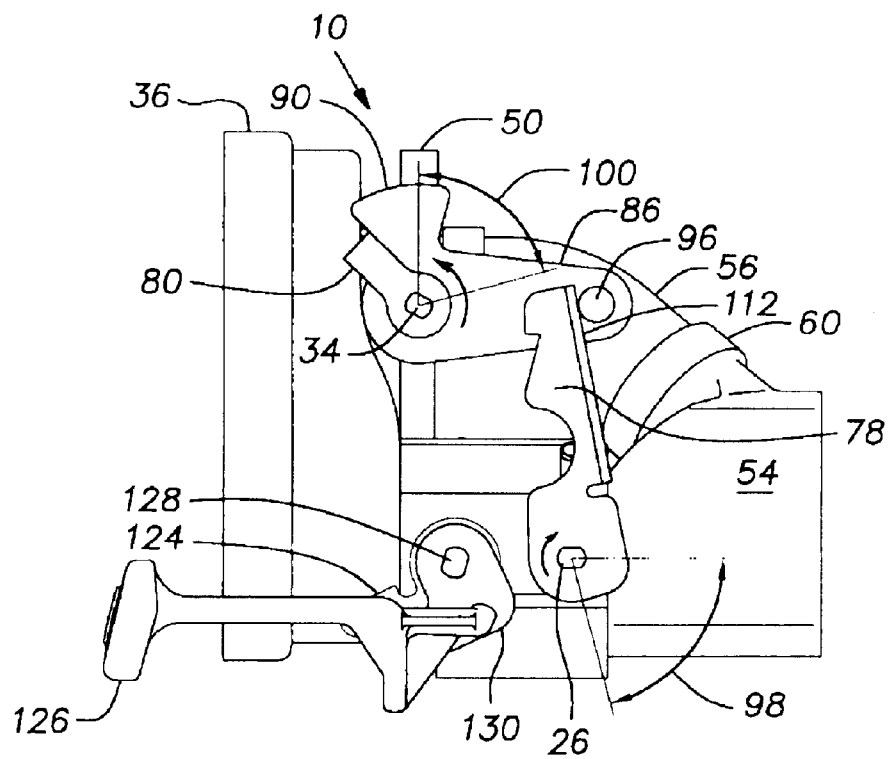
FIG. 12 is the same view as FIG. 10 but showing the throttle lever at full open position and the air valve also is rotated to its full open position.

A second end 76 of the throttle valve shaft 26 projects out of the carburetor housing 16 and fixedly carries a throttle lever 78. On opposite ends of the throttle valve shaft 26, the actuating lever 68 and the throttle lever 78 both being fixedly fastened to the throttle valve shaft 26 rotate together. The air valve shaft 34 carries an air valve lever 80, which is fixedly disposed at an end 82 of the air valve shaft 34, and is spring loaded in the closing direction of the air valve 32 by means of an air valve return spring 84. An activating lever 86 is pivotally mounted on the air valve shaft 34, but is not fixed to the air valve shaft 34, and therefore is free to rotate about the air valve shaft 34. The activating lever 86 is spring loaded in the closing direction of the air valve 32 by means of a return spring 88. The activating lever 86 has a protruding member 90 that will contact the air valve lever 80 on the air valve shaft 34 at a specific point during it's rotation, at an angle of engagement 92 as shown in FIG. 12. This angle of engagement 92 corresponds to the angle that the throttle valve 24 must rotate before the air valve 32 starts to move and is a functional aspect of the two-stroke engine's acceleration performance. The nominal measure of the angle of engagement 92 is approximately 30 degrees, but can be varied to obtain different acceleration properties.

Figure 15:
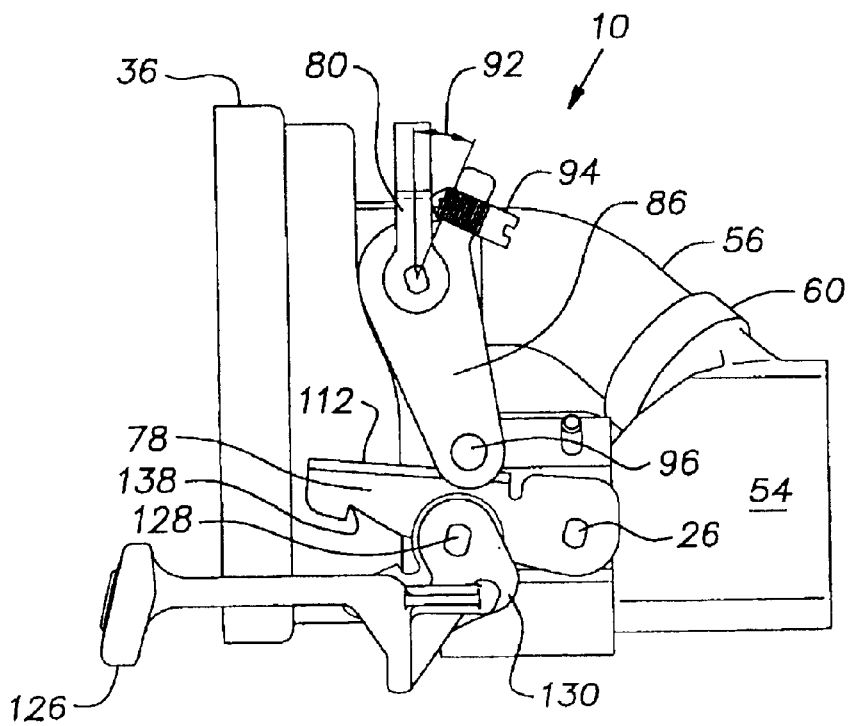
FIG. 15 is a view of the carburetor and air-valve assembly according to a third embodiment of the invention, corresponding to the view of FIG. 10, including an adjustment screw.

An alternative design according to a third embodiment of the present invention is shown in FIG. 15 which includes an adjustment screw 94 is shown fastened into the activating lever 86 and the end of the adjustment screw 94 contacts the air valve lever 80. By turning the adjustment screw 94 in and out it will effectively change the angle of engagement 92 from the nominal 30-degree angle. This adjustment will allow for manufacturing to accommodate for variances that occur because of normal manufacturing tolerances.

Figure 10:
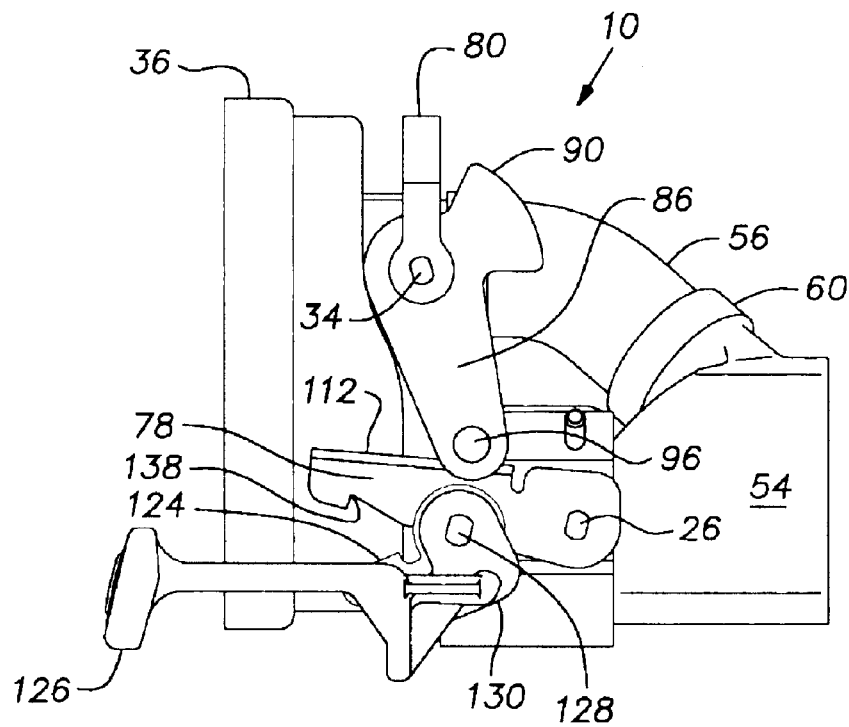
FIG. 10 is a view of the carburetor and air-valve assembly of FIG. 1 taken in the direction of line B—B in FIG. 6, including a choke knob attached thereto.
Figure 11:
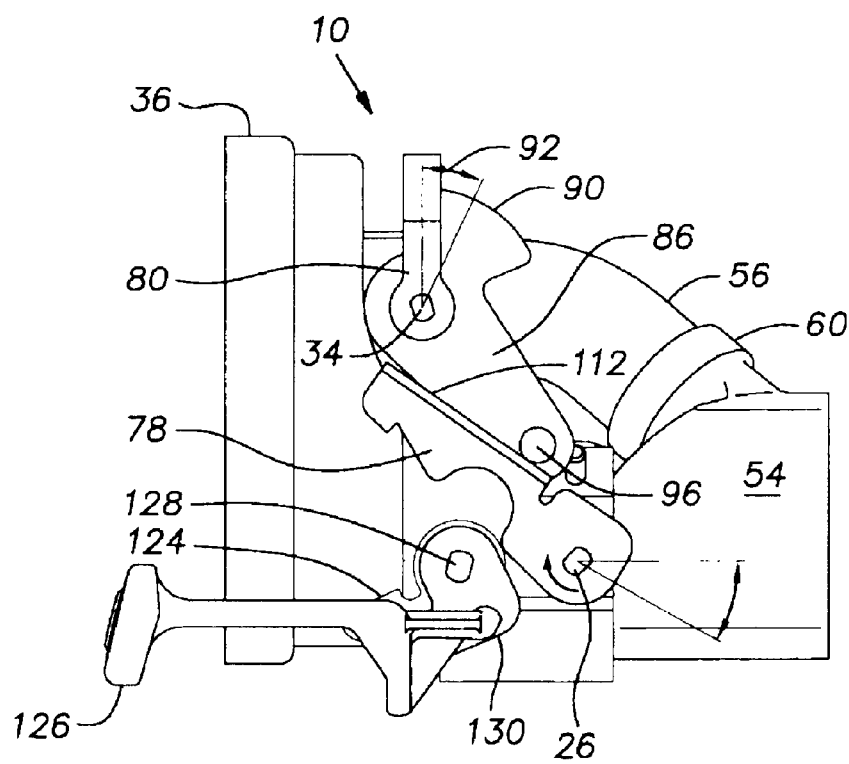
FIG. 11 is the same view as FIG. 10 but showing the throttle lever rotated until it first starts to open the air valve.

As shown in FIG. 10, the activating lever 86 has a protruding boss 96, which intersects the path of the throttle lever 78 and forms a transmission connection between the throttle valve 24 and air valve 32 (see FIG. 9) The boss 96 slides along the throttle lever 78 for the entire range of angular rotation 98 of the throttle valve shaft 26 to fully open the throttle valve 24 as shown in FIG. 12. During the angle of rotation 98 of the throttle valve 24 the activating lever 86 will progress through its angular range of rotation 100 until the air valve shaft 34 has also achieve full open position for the air valve 32. The progression of the throttle valve 24 opening in respect to the air valve 32 will have an affect on the acceleration of the two-stroke engine's performance. Both the throttle valve 24 and the air valve 32 by design will open fully at the end of the rotational travel 98 and 100, but the rate of opening maybe different. FIG. 18 shows an example of the rate of opening of the throttle valve 24 and the air valve 32.

Figure 16:
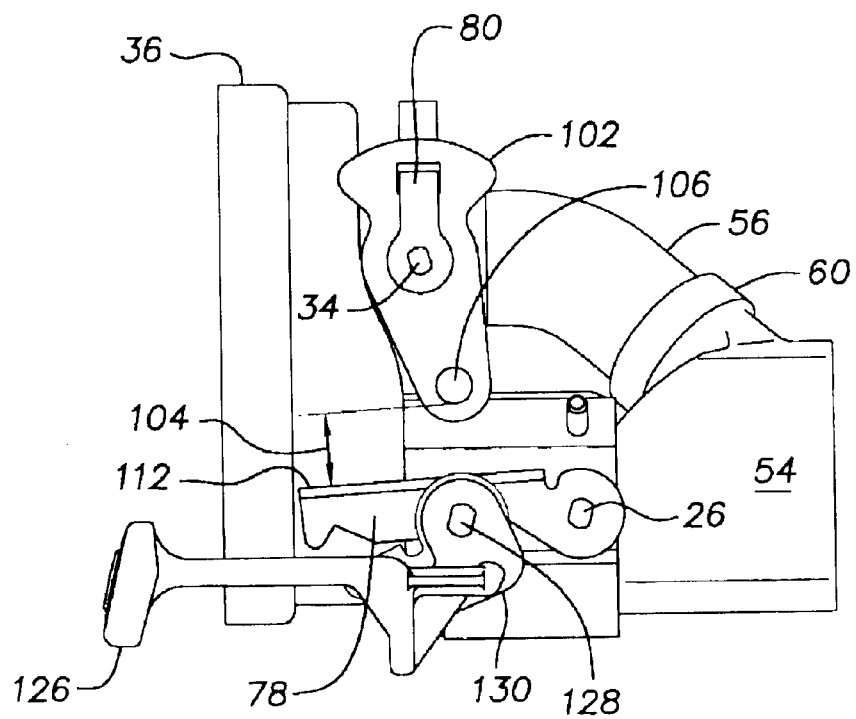
FIG. 16 is a view of the carburetor and air-valve assembly according to a fourth embodiment of the invention, corresponding to the view of FIG. 10.
Figure 17:
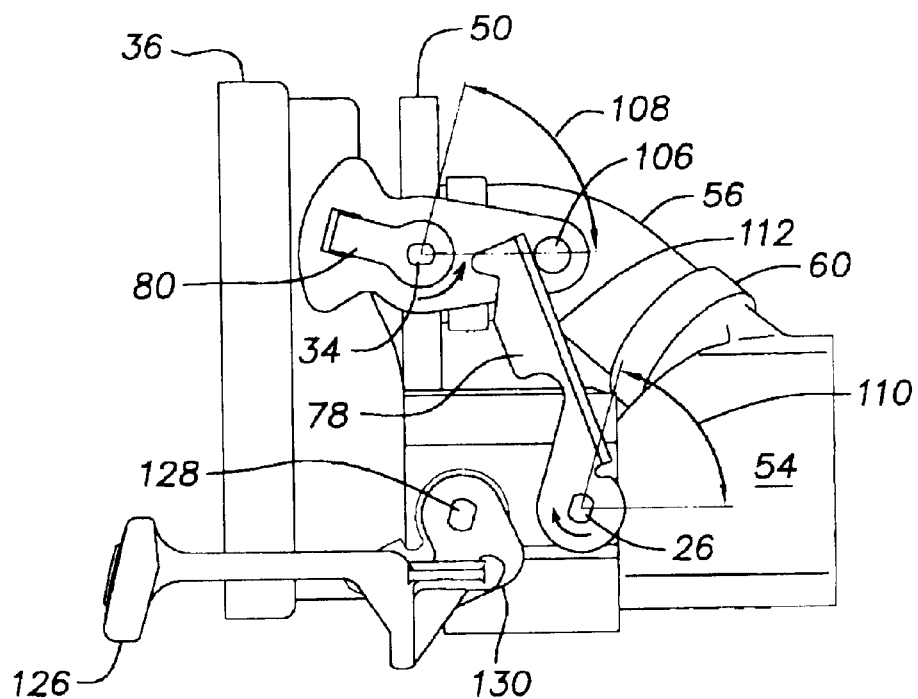
FIG. 17 is a view of the embodiment of FIG. 17 with the levers rotated to a full throttle position.

An alternate design according to a fourth embodiment of the present invention is shown in FIG. 16 & FIG. 17. The pivotally mounted activating lever 86 is replaced with a fixed activating lever 102. The fixed activating lever 102 is positively connected to the end of the air valve shaft 34 and the air valve lever 80 so that they rotate together. There is an intentional clearance 104 between the throttle lever 78 and a protruding boss 106 on the activating lever 102. The clearance 104 allows for the throttle valve 24 to open 30 degrees of rotation while the air valve 32 remains closed. After the initial 30 degrees of travel of the throttle lever 86, the throttle lever 86 will contact the protruding boss 106 on the activating lever 102 and start rotating the air valve 32 in the opening direction. Both the throttle valve 24 and the air valve 32 will reach full open position at the same time, but not at the same rate, similar to FIG. 18. The throttle valve 24 and, air valve 32 are shown in FIG. 17 at their respective full open positions with the levers 78, 80 at their full limits of travel 108 and 110.

As shown in FIG. 18 the slope and intersection points of the curves can be arranged and changed with change in pivot positions of the two butterfly valve shafts 34, 26 in respect to each other, and in respect to the contact point of the protruding boss 96 or 106, along with the angle of engagement 92 of first contact between the activating lever 86 and air valve lever 80. Even the physical shape of the contact boss 96 can be changed from a true circle cross section to one of an elliptical shape, cam profile, or other shape. A contact surface 112 of the throttle lever 78 can also be formed with a curved profile to achieve a similar change in the curves shown in FIG. 18.

Figure 19:
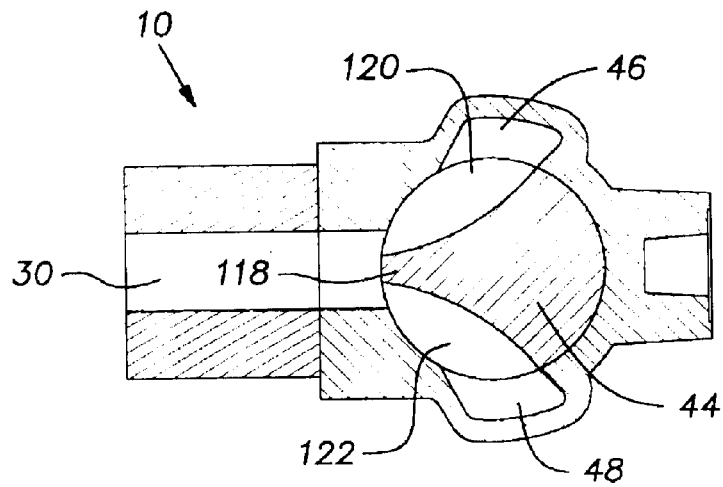
FIG. 19 is a cross sectional view of the carburetor and air valve assembly of FIG. 1 taken along section line 19—19, including an engine cylinder.

Starting from idle position shown in FIG. 10 and FIG. 2, the throttle valve 24 is opened by pivoting the throttle valve shaft 26 in an opening direction 114, so that greater quantity of fuel-air mixture is conveyed to the internal combustion engine 14 so that the speed of the internal combustion engine increases. As soon as the throttle valve 24, i.e. the throttle valve shaft 26, in the opening direction 114 has transmittally rotated the activating lever 86 through a free play extent to the angle of engagement 92 that is determined by the spacing between the protruding member 90 on the activating lever 86 and the air valve lever 80, then by means of rotational force i.e. torque, the air valve lever 80 is also pivoted in an opening direction 116, as a result of which by means of the shaft 34 the air valve 32 in the air channel 30 is carried along in the opening direction 116. In addition to the fuel-air mixture, air for combustion by itself, which is expediently collected previously in the transfer ports 46, 48 from the crankcase to the combustion chamber, is conveyed to the internal combustion engine via the air channel 30. For this purpose, as shown in FIG. 19, a branch element 118 is formed by the piston casting 44; the branching air supply channels 120 and 122 formed in the piston casting 44 open into the corresponding transfer ports 46 and 48.

Figure 20:
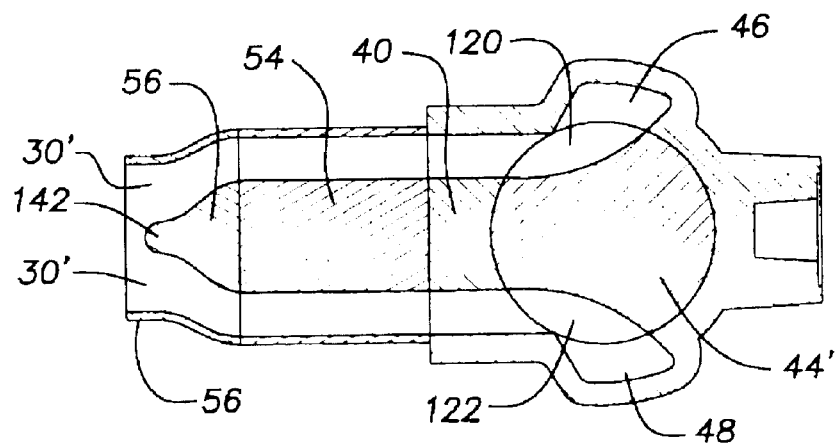
FIG. 20 is a cross sectional of a carburetor and air valve assembly, corresponding to FIG. 1, according to a sixth embodiment of the present invention.

An alternate design according to a sixth embodiment of the present invention is shown in FIG. 20, where an alternative air channel 30' branch element 142 is located upstream from the piston 44, which has separate air channels 120 and 122 formed in an alternative piston casting 44'. The branch element can be formed within the casting of the cylinder 40, or within the intake adaptor 54, or within the air tube 56, or any combination thereof.

Along with the mechanical transmission between the air valve and the throttle valve there is another mechanism that allows for easier starting of the two-cycle engine. A "fast idle" portion of the linkage mechanism mounted on the carburetor 12 is designed to manually advance the throttle valve 24 position approximately 20 degrees for starting of the engine 14. Of course, this angle can be adjusted as appropriate for a particular application. This throttle advance allows for easier starting of the engine 14 since there will be more fuel allowed to enter the engine than would be allowed at the normally closed or idle position. A fast idle lever 124 is rotated when a choke knob 126 is pulled by the operator, which in turn rotates the choke valve 22. The fast idle lever 124 is pivoted to a choke valve shaft 128 such that it is free to rotate about the choke valve shaft 128. When the choke knob 126 is pulled, a choke valve lever 130 catches the fast idle lever 124 and rotates it which in turn lifts the throttle valve lever 78 into the "fast idle position." The two levers 78, 124 are held in place by a small catch or notch 138 formed into the throttle lever 78. The choke knob 126 can be pushed back in to open the choke valve 22 without affecting the fast idle advance because the fast idle lever 124 turns freely on the choke valve shaft 128. Small torsion springs are located on both valve shafts 26, choke valve shaft 128 to provide positive return force to their normal positions.

Figure 13:
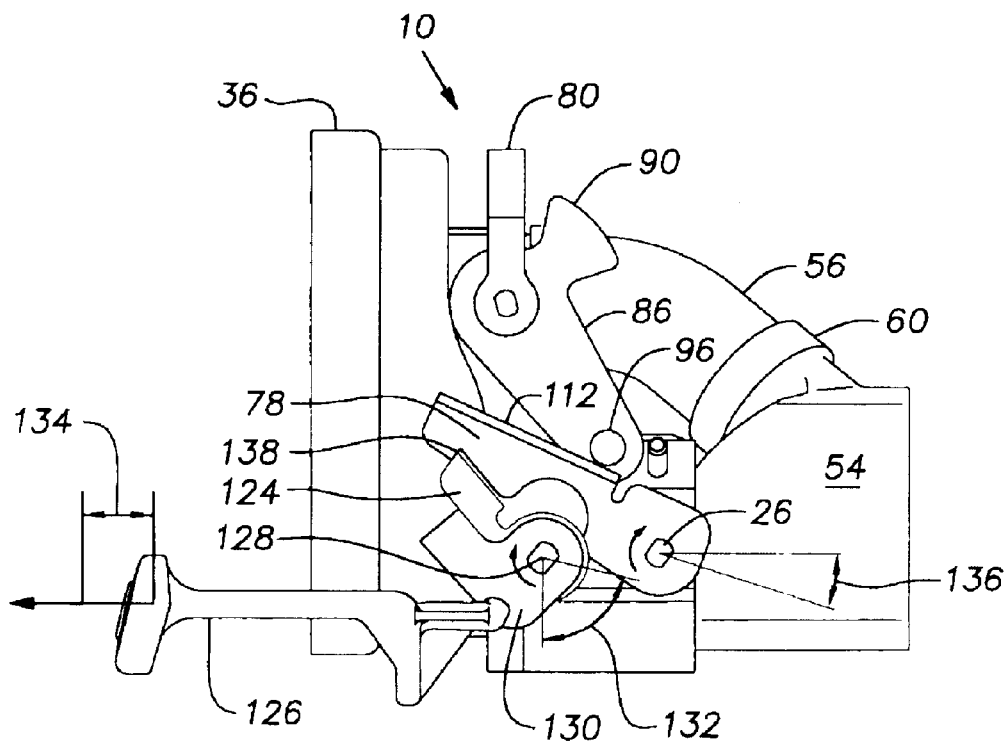
FIG. 13 is the same view as FIG. 10 but showing the throttle lever in a fast idle position, and the choke knob pulled out to a full choke position.

As shown in FIG. 13 pulling the choke knob 126 out to a limit of linear travel 134, which is nominally 10 mm, will transversely rotate the choke valve shaft 128 for an angle of rotation 132. The end of the choke knob 126 is pivotally connected to the choke lever 130. The choke lever 130 is fixed to the end of the choke valve shaft 128 and has a butterfly valve 22 affixed to the choke valve shaft 128. The choke valve shaft 128 is pivotally mounted in the carburetor housing 16 and when closed will enrich the fuel to air ratio for easier cold starting of the two-cycle engine 14. The choke lever 130 when rotated will contact a fast idle latch or lever 124. The fast idle lever 124 is pivotally mounted on the choke valve shaft 128 and is free to rotate about that axis. When the fast idle lever 124 is rotated by the choke lever 130 through it angle of rotation 132 it contacts the throttle lever 78 and rotates the throttle lever 78 for an angle of rotation 136 to a fast idle position. In this embodiment, the angle of rotation 136 is approximately 20 degrees open from its at rest, closed position and allows the throttle valve 24 to be positioned for optimum starting of the two-cycle engine. The throttle lever 78 is held in the starting position by a small notch 138 (FIG. 12) formed in the throttle lever 78 which the fast idle lever 124 engages.

Figure 6:
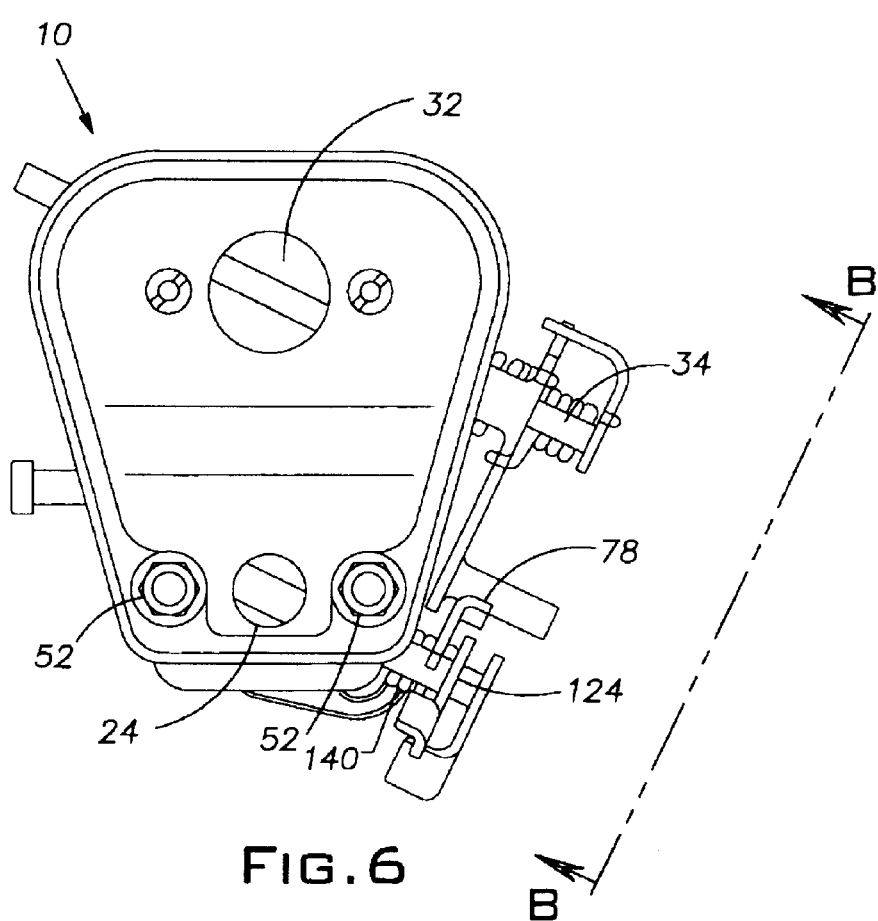
FIG. 6 is a left side view of the carburetor and air-valve assembly of FIG. 1.
Figure 14:
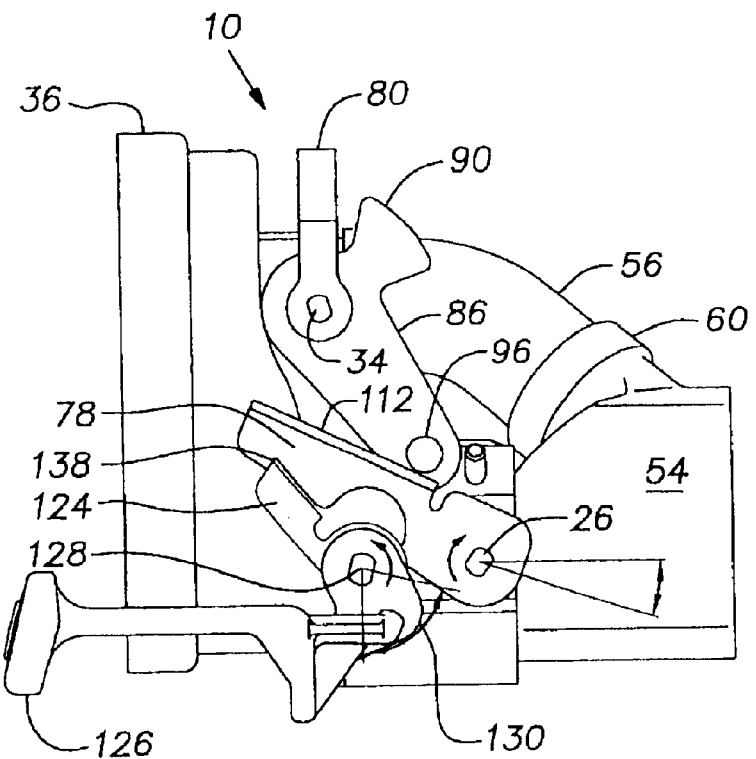
FIG. 14 is the same view as FIG. 13 but showing the choke pushed in to it's normally open position, and the fast idle still activated.

Often when starting a two-cycle engine it is necessary to repeatedly open and close the choke valve. During this process, the throttle lever 78 it is kept in the fast idle position by the fast idle lever 124 as shown in FIG. 14. The choke knob 126 can be pushed back-in the limit of travel 134 to open the choke butterfly valve 22 by means of the transmission connection. The fast idle lever 124 will remain engaged in the notch 138 in the throttle lever 78, and the throttle lever 78 will stay at the rotated angle 136 or the fast idle position. This is achieved because the fast idle lever 124 is freely pivot about the choke valve shaft 128. A return spring 140 as shown in FIG. 6 is connected to the fast idle lever 124 and the carburetor housing 16. The return spring 140 acts upon the fast idle lever 124 in a counterclockwise direction (opposite direction 114), which will disengage the first idle lever 124 from the throttle lever 78. Thus, the fast idle lever 124 can be returned to the normal at-rest position by activating the throttle trigger 70 which is connected to the throttle lever 78. When the throttle lever 78 is rotated open, the fast idle lever 124 is released by the notch 138 in the throttle lever 78 allowing the return spring 140 to rotate the fast idle lever 124 back to the normal at-rest position.

Although the described embodiments related to a piston ported two-cycle engine with stratified air scavenging, meaning the piston 44 opened and closed the air port 38 during the normal piston stroke in the cylinder 40, the present invention can be equally utilized on a two-cycle engine with stratified air scavenging with a reed style check valve mounted in the transfer ports 46, 48.

It should be evident that this disclosure is by way of example and that various changes may be made by adding, modifying or eliminating details without departing from the fair scope of the teaching contained in this disclosure. The invention is therefore not limited to particular details of this disclosure except to the extent that the following claims are necessarily so limited.

What is claimed is:

1. A carburetor and air valve assembly for a two-cycle internal combustion engine with stratified air scavenging, the assembly comprising:
   a housing assembly;
   an intake channel in the housing assembly for delivering fuel and air mixture to an intake port of the engine;
   a throttle valve disposed within the intake channel and fixed to a pivotable throttle valve shaft;
   a throttle lever fixed to the throttle valve shaft;
   an air channel in the housing assembly for delivering fuel-free air to an air port of the engine;
   an air valve disposed within the air channel and fixed to a pivotable air valve shaft;
   an air valve lever fixed to the air valve shaft; and
   an activating lever moveably mounted to the housing assembly and adapted to transmit movement of the throttle lever to the air valve lever, wherein a rate of movement of the throttle lever is different from a rate of movement of the air valve lever.

2. The carburetor and air valve assembly according to claim 1, wherein the air channel comprises two branches each connected to one of two air ports of the engine.

3. The carburetor and air valve assembly according to claim 1, wherein the housing assembly comprises a carburetor housing comprising the intake channel and an air valve housing comprising the air channel.

4. The carburetor and air valve assembly according to claim 1, wherein the activating lever is pivotably mounted to the housing assembly.

5. The carburetor and air valve assembly according to claim 4, wherein the activating lever is pivotally mounted to the air valve shaft.

6. The carburetor and air valve assembly according to claim 5, wherein the throttle lever has an initial position associated with a fully dosed position of the throttle valve and wherein the activating lever transmits motion to the air valve lever only after a predetermined angle of rotation of the activating lever from the initial position, the predetermined angle being greater than zero.

7. The carburetor and air valve assembly according to claim 4, wherein the activating lever is fixedly mounted to the air valve shaft.

8. The carburetor and air valve assembly according to claim 7, wherein the throttle lever has an initial position associated with a fully closed position of the throttle valve and wherein the throttle lever first contacts the activating lever at a predetermined angle of rotation from the initial position, the predetermined angle being greater than zero.

9. The carburetor and air valve assembly according to claim 1, wherein the housing assembly comprises a filter housing and the air valve shaft is pivotably mounted to the filter housing.

10. The carburetor and air valve assembly according to claim 1, wherein the air channel is substantially straight.

11. The carburetor and air valve assembly according to claim 1, wherein the air channel is curved.

12. The carburetor and air valve assembly according to claim 1, further comprising an adjustment mechanism provided to adjust a range over which movement is transmitted by the activating lever from the throttle lever to the air valve lever.

13. The carburetor and air valve assembly according to claim 1, further comprising:
   a choke valve disposed within the intake channel and fixed to a pivotable choke valve shaft;
   a choke valve lever fixed to the choke valve shaft; and
   a fast idle latch engagable by the choke valve lever to hold the throttle lever in a fast idle position until the throttle lever is separately moved.

14. A two-cycle internal combustion engine system comprising:
   a carburetor comprising an intake channel, a choke valve in the intake channel fixed to a pivotable choke valve shaft and a throttle valve in the intake channel fixed to a pivotable throttle valve shaft;
   an air channel in communication with fresh air and comprising an air valve fixed to a pivotable air valve shaft;
   a cylinder;
   a combustion chamber within the cylinder;
   a fuel port communicating the intake channel with the cylinder;
   an air port communicating the air channel with the cylinder;
   a piston arranged for reciprocating movement within the cylinder and comprising a transfer port for intermittently connecting the fuel port and air port with the combustion chamber;
   a throttle lever fixed to the throttle valve shaft;
   an air valve lever fixed to the air valve shaft;
   an activating lever pivotably mounted to the air valve shaft and adapted to transmit movement of the throttle lever to the air valve lever after a predetermined angle of rotation of the throttle lever;
   a choke valve lever fixed to the choke valve shaft; and
   a fast idle latch engagable by the choke valve lever to hold the throttle lever in a fast idle position until the throttle lever is separately moved.

* * * * *

UNITED STATES PATENT AND TRADEMARK OFFICE
CERTIFICATE OF CORRECTION

PATENT NO. : 6,708,958 B1
DATED : March 23, 2004
INVENTOR(S) : Paul A. Warfel et al.

It is certified that error appears in the above-identified patent and that said Letters Patent is hereby corrected as shown below:

Column 1,
Line 33, please delete "airport", and insert therefor -- air port --.

Column 2,
Line 37, please delete "third", and insert therefor -- fifth --.
Line 41, please delete "fourth", and insert therefor -- sixth --.
Line 43, please delete "FIG. 17", and insert therefor -- FIG. 16 --.
Please delete lines 51-53 as they currently appear, and insert therefor -- FIG. 20 is a cross-sectional view of a carburetor and air valve assembly, corresponding to the view of FIG. 19, according to a seventh embodiment of the present invention. --.
Line 60, please delete "6-15", and insert therefor -- 6-14 --.

Column 4,
Lines 11 and 15, please delete "air valve housing 32", and insert therefor -- air valve housing 50 --.
Line 54, please delete "6-15", and insert therefor -- 6-14 --.

Column 5,
Line 11, please delete "Thus", and insert therefor -- This --.
Line 42, please delete "FIG. 12", and insert therefor -- FIG. 11 --.
Line 49, please delete "third", and insert therefor -- fifth --.

Column 6,
Line 9, please delete "fourth", and insert therefor -- sixth --.
Line 63, please delete "sixth", and insert therefor -- seventh --.

Signed and Sealed this

Thirtieth Day of November, 2004

JON W. DUDAS
*Director of the United States Patent and Trademark Office*